United States Patent
Rudd et al.

(10) Patent No.: US 8,549,911 B2
(45) Date of Patent: Oct. 8, 2013

(54) MULTI-LEVEL LIQUID LEVEL MAGNETIC SENSOR

(75) Inventors: Jeffrey P Rudd, Foxboro, MA (US); James M Pellegrini, Millbury, MA (US); Brian J Bonenfant, Attleboro, MA (US)

(73) Assignee: Ilinois Tool Works Inc., Glenview, IL (US)

( * ) Notice: Subject to any disclaimer, the term of this patent is extended or adjusted under 35 U.S.C. 154(b) by 509 days.

(21) Appl. No.: 12/994,857

(22) PCT Filed: May 27, 2009

(86) PCT No.: PCT/US2009/045220
§ 371 (c)(1),
(2), (4) Date: Nov. 28, 2010

(87) PCT Pub. No.: WO2009/146308
PCT Pub. Date: Dec. 3, 2009

(65) Prior Publication Data
US 2011/0138907 A1    Jun. 16, 2011

Related U.S. Application Data

(60) Provisional application No. 61/057,073, filed on May 29, 2008.

(51) Int. Cl.
*G01F 23/74* (2006.01)
(52) U.S. Cl.
USPC ............................................ 73/313
(58) Field of Classification Search
USPC .................. 73/313, 314, 306–308, 290 R
See application file for complete search history.

(56) References Cited

U.S. PATENT DOCUMENTS

| | | | | |
|---|---|---|---|---|
| 1,617,287 A | * | 2/1927 | Huggins | 338/12 |
| 3,200,645 A | * | 8/1965 | Levins | 73/313 |
| 3,678,750 A | * | 7/1972 | DiNoia et al. | 73/313 |
| 3,976,963 A | * | 8/1976 | Kubler | 335/206 |
| 4,064,451 A | * | 12/1977 | Foxworthy | 324/207.13 |
| 4,084,436 A | * | 4/1978 | Smitherman | 73/313 |
| 4,384,184 A | * | 5/1983 | Alvarez | 200/84 C |
| 4,537,070 A | * | 8/1985 | Milish | 73/313 |
| 4,796,472 A | * | 1/1989 | Lew | 73/308 |
| 4,955,231 A | * | 9/1990 | Mahoney | 73/313 |
| 4,976,146 A | | 12/1990 | Senghaas et al. | |
| 5,347,864 A | * | 9/1994 | Senghaas et al. | 73/313 |
| 5,829,303 A | * | 11/1998 | Fraser | 73/319 |
| 6,571,626 B1 | * | 6/2003 | Herford | 73/314 |

FOREIGN PATENT DOCUMENTS

| | | |
|---|---|---|
| DE | 2758379 A1 | 11/1978 |
| DE | 4111975 A1 | 10/1992 |
| FR | 1520771 A | 4/1968 |

OTHER PUBLICATIONS

ISR for PCT/US2009/045220 mailed Aug. 3, 2009.

* cited by examiner

*Primary Examiner* — John Fitzgerald
(74) *Attorney, Agent, or Firm* — Mark W. Croll; Paul F. Donovan

(57) ABSTRACT

A liquid level sensor employs a set of axially displaced magnetic sensing switches and a magnet on a float that may rise and fall on liquid level to activate and deactivate the switches. The switches and magnet are configured so that movement of the magnetic float activates a new switch before deactivation of an adjacent previously activated switch. An electronic circuit provides a signal based on the uppermost activated switch to provide a signal that is monotonic with liquid level. The design may be readily implemented using reed switches and a resistive ladder.

10 Claims, 2 Drawing Sheets

MULTI-LEVEL LIQUID LEVEL MAGNETIC SENSOR

CROSS REFERENCE TO RELATED APPLICATION

This Non-Provisional Application is national phase of International Application Number PCT/US2009/045220 filed May 27, 2009, and claims benefit to U.S. Provisional Application Ser. No. 61/057,073 filed May 29, 2008 hereby incorporated by reference.

FIELD OF THE INVENTION

The present invention relates to fluid level sensors, particularly sensors that may be suitable for use in monitoring urea levels in diesel engine emission control systems using "selective catalytic reduction" (SCR).

BACKGROUND OF THE INVENTION

A wide variety of liquid level sensing technologies exist including those using ultrasonic signals, changes in capacitance, and changes in electrical resistance. One type of liquid level sensor employs magnetic reed switches arranged along a column. The reed switches close in the proximity of a magnetic field which may be produced by a magnet held in a float rising and falling with the liquid level. In order to provide a continuous output signal that changes monotonically (that is, always increases and never decreases as the liquid level rises and always decreases without increasing as the liquid level falls), multiple floats are used, each constrained to move within a small range. As liquid rises, the lowest float is moved upward switching its associated reed switch and is held upward against a stop as the liquid rises pass it to a second float. The stops ensure that the lower floats never rise past the switching point of their associated reed switches such as would permit their associated reed switches to open and erroneously suggest a fall in liquid height when liquid is in fact rising. A drawback to this design is the cost and reliability problems associated with a multiple float system.

SUMMARY OF THE INVENTION

The present invention employs a single float moving past a series of reed switches. The reed switches are attached to a resistive ladder to provide an increasing voltage as the float rises and different reed switches are closed. An improved magnet design in the float and a staggering of parallel reed switches is used to obtain a "make before break" operation of the reed switches allowing an expanded operating range of a single float without the possibility of non-monotonic behavior in the output signal.

Specifically then, the present invention provides a liquid-level sensor having a guide that may extend along an axis in a vertical direction in a liquid holding tank. A float is positioned to move along the guide with changes in liquid height within the tank wherein the float includes at least one magnetic element applying a magnetic field to the guide, the magnetic field moving along the guide with movement of the float. The guide has a set of axially-spaced magnet sensors switching between an unactivated state and an activated state upon exposure to the magnetic field and the sensors are positioned along the guide so that movement of the magnetic float activates a new sensor before deactivation of an adjacent previously activated sensor. The sensor further includes an electrical circuit communicating with the magnet sensors to provide a signal being a function only of the state of an uppermost activated sensor.

It is a feature of at least one embodiment of the invention to provide a simple circuit that produces a monotonic signal with movement of the float. Monotonic in this sense means that the signal consistently increases or decreases as the height of the float increases or decreases and that the signal never both increases and decreases when the float is moving in one direction.

The sensors may be normally open magnetic reed switches.

It is therefore a feature of at least one embodiment of the invention to provide a low-cost and robust sensor system that works effectively with low-cost reed switches.

Each sensor may be a set of multiple magnetic reed switches wired in parallel and each reed switch may be displaced axially from other reed switches of the sensor.

It is therefore a feature of at least one embodiment of the invention to provide an effective reed switch having a larger range of activation than can be readily obtained by under the constraints of the reed switch physical design.

The axial spacing of the multiple magnetic reed switches of each sensor may be different from the axial spacing old magnetic reed switches between sensors.

It is therefore a feature of at least one embodiment of the invention to provide the ability to flexibly adjust the number of discrete levels that may be distinguished by the sensor and the axial separation among the levels for practical magnet design.

The electrical circuit may be a resistor ladder of series-connected resistors defining connection nodes and wherein the sensors connect the nodes to ground when activated and wherein the signal is a voltage at a node.

It is therefore a feature of at least one embodiment of the invention to provide a simple circuit that may be sensitive only to the uppermost activated sensor.

Each reed switch may have a principle axis canted with respect to the axis of the guide.

It is therefore a feature of at least one embodiment of the invention to permit the use of multiple closely spaced reed switches in a narrow guide form facto with long magnetic reed switches having improved sensitivity.

The magnet element may be a pair of axially separated toroidal magnets having axially opposed magnetic fields, the ring magnets positioned around the guide and within the float.

It is therefore a feature of at least one embodiment of the invention to provide a magnet element producing a magnetic field having an extended axial activation length.

Other features and advantages of the invention will become apparent to those skilled in the art upon review of the following detailed description, claims and drawings in which like numerals are used to designate like features.

Figure 1:
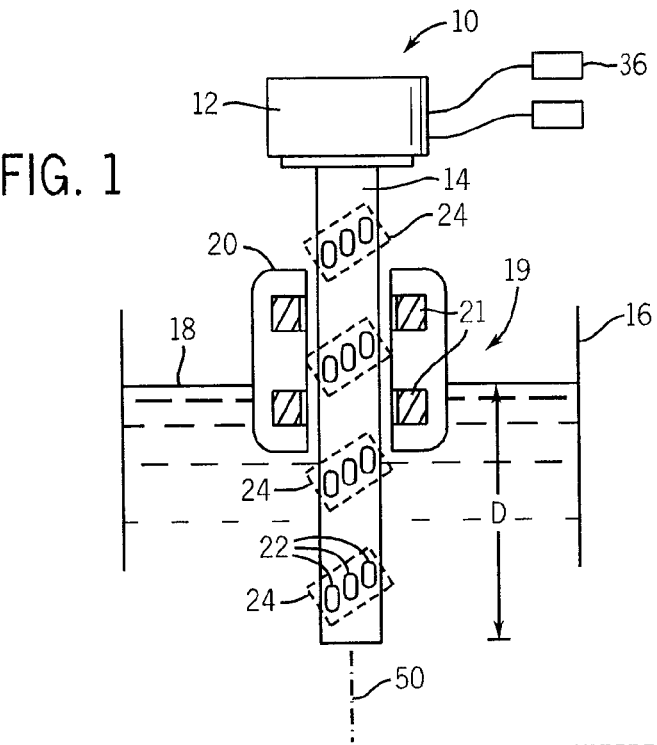
FIG. 1 is a simplified cross-sectional view of the present invention showing a magnet float having two opposed toroidal magnets positioned to move along a central guide holding staggered reed switches.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a liquid level sensor 10 includes a mounting bracket 12 fixing a central shaft 14 in vertical orientation in a tank 16 holding a liquid 18 such as urea.

A float 20 rests in the liquid 18 to move freely up and down about the shaft 14 with respect to the mounting bracket 12. The float 20 may be hollow to provide an inner air chamber sealed against the liquid 18 or maybe made of a buoyant material that resists the liquid 18. In either case, the float 20 is designed so that its density is less than that of the liquid 18 so that the float 20 is sufficiently buoyant so that a portion rises above the surface of the liquid 18 and so that the entire float 20 rises and falls to track the surface of the liquid 18 and thus the height D of the liquid from an arbitrary reference point (typically a bottom of the tank 16).

The float 20 may incorporate two toroidal magnets 21 forming a magnet element 19 positioned about the shaft 14 and separated axially along the shaft 14. The float 20 and the toroidal magnets 21 made thus present a central hole that receives the shaft 14 with the float 20 surrounding the shaft 14 to be guided thereby.

Figure 5:
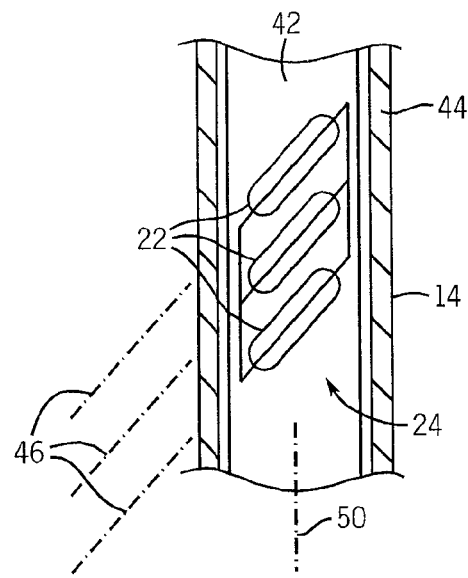
FIG. 5 is a fragmentary cross-section through the shaft of FIG. 1 showing a canting of the magnetic reed switches with respect to a shaft axis.

Referring also to FIG. 5, the shaft 14 may include a set of magnetically activated switches 24 comprised each of a set of reed switches 22. The magnetically activated switches 24 may be protected from the liquid 18 by an outer non-magnetic tubular housing 44 sealed at its lower and upper ends to provide a cylindrical protected inner volume holding the magnetically activated switches 24.

Figure 2:
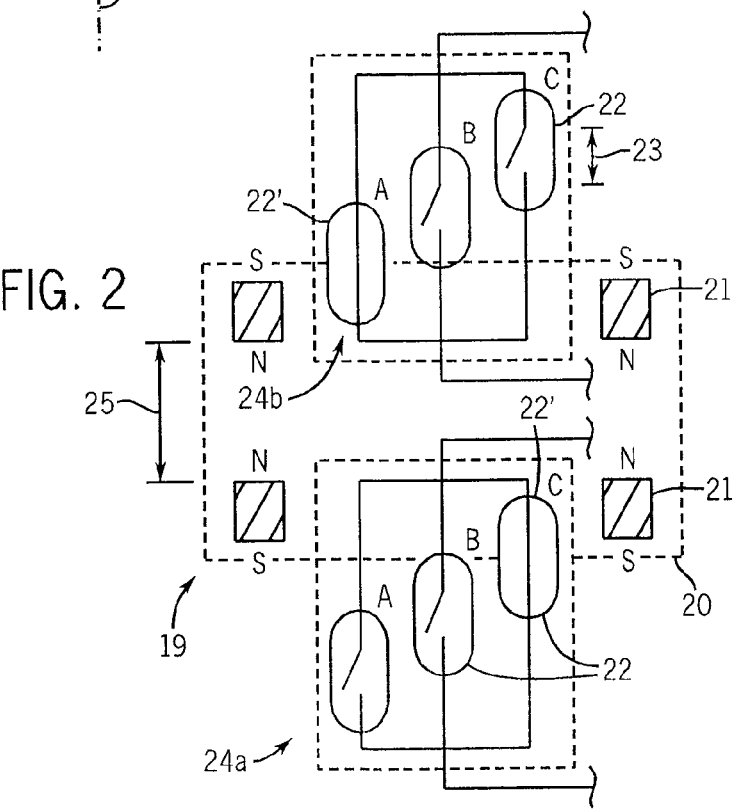
FIG. 2 is a detailed schematic representation of two banks of reed switches showing a "make before break" behavior between successive banks of reed switches.

Referring now to FIG. 2, the reed switches 22 may be normally open reed switches which close under the influence of a magnetic field. The reed switches 22 may be collected into banks to form the magnetically activated switches 24, for example, magnetically activated switch 24a and magnetically activated switch 24b separated actually along the shaft 14. Within each magnetically activated switch 24, the reed switches 22 (labeled A, B, and C) may be staggered axially along the shaft 14 to have an intra-switch separation distance 23 within each magnetically activated switch 24 and an inter-switch separation distance 25 between adjacent magnetically activated switches 24. Each of the reed switches 22 within one magnetically activated switch 24 are connected in parallel so that any one of the reed switches 22 closing creates an electrical short across the magnetically activated switch 24. This staggering increases the effective operating range of the magnetically activated switch 24 beyond the operating range of an individual reed switch 22.

Referring still to FIG. 2, the toroidal magnets 21 of the magnet element 19 have opposed poles to increase the magnetic intensity for switching the reed switches 22 into a zone between the toroidal magnets 21. In particular, the north faces of the toroidal magnets 21, being a lower base of the upper toroidal magnets 21 and an upper face of the lower toroidal magnets 21 are opposed to each other along the axis of the shaft 14.

The magnetically activated switches 24 are spaced apart by inter-switch separation distance 25 to define detection levels for a desired range of liquid heights D. The number of reed switches 22 in each magnetically activated switch 24 and the intra-switch separation distance 23 are set to ensure continuous activation of at least one reed switch 22 throughout the entire range of travel of the float 20. In particular, the reed switches 22 are spaced apart by intra-switch separation distance 23 such that the magnet element 19 activates a reed switch 22 before deactivation of an adjacent previously reed switch 22. In this way, for example, when the float 20 is falling, at least one reed switch 22' of a lower magnetically activated switch 24a will be closed before, or at least simultaneously with, the opening of the last closed reed switch 22" of adjacent upper magnetically activated switch 24b in a "make before break" operation. As will be seen, this provides for monotonic output of the liquid level sensor 10.

Figure 3:
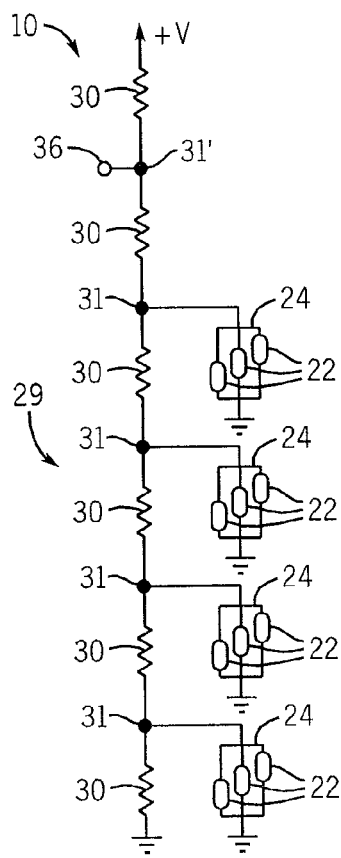
FIG. 3 is a simplified schematic of the resistor ladder used to produce a voltage rising with rising liquid level as reed switches close.

Referring now to FIG. 3, a readout circuit for the liquid level sensor 10 of the present invention may produce a signal dependent only on the highest most magnetically activated switch 24 having one of its reed switches 22 activated. This may be done with the use of a resistor ladder 29 comprising a set of series connected resisters 30 defining interconnecting nodes 31 and having known voltage connected across the resistor ladder 29, for example, having an upper end attached to a voltage (e.g. 12 V, 24 V, etc.) and a lower end attached to ground.

An upper node 31' may provide an output voltage connected to a tab 36 that may connect to automotive instrumentation or the like such as a gauge or computer input. Each of the lower nodes 31 may be connected to one of the magnetically activated switches 24 such that when the magnetically activated switch 24 is activated they connect the given node 31 to ground. In this way, as the float 20 rises to activate successively higher magnetically activated switches 24, resisters 30 are bypassed, generally decreasing the voltage at node 31' as a function of float height. Generally the upper two resisters 30 will have different values from the remaining resisters 30, these upper two resisters defining the lowest value of voltage obtained with the float 20 at its uppermost position and the range of voltages as the float 20 travels its full distance. Resistors 30 (beneath the upper two resisters 30) may be of uniform or different values so as to provide an arbitrary function relating float height to voltage.

Figure 4:
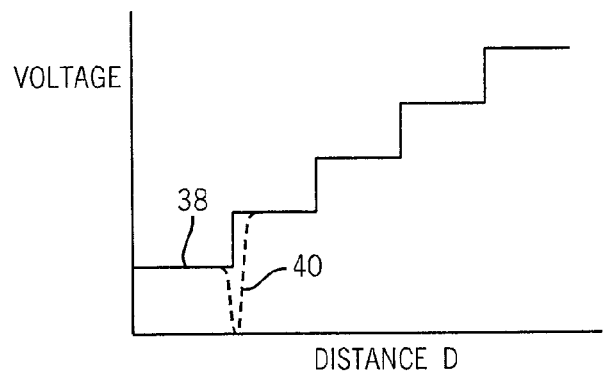
FIG. 4 is a plot of voltage versus distance showing monotonic output provided by the present invention.

Referring now to FIG. 4, the configuration of the magnetically activated switches 24 in FIG. 3 provides for a stair stepped monotonic voltage output 38 at output tab 36 rising with the height D of the liquid 18. The "make before break" feature prevents a voltage dip 40 such as would create spurious level artifacts suggesting a liquid level drop as the float 20 rises between magnetically activated switches 24. The total staircase height and the height of each stair step may generally be adjusted by changing the values of the resisters 30. The functional relationship between voltage and distance D may be varied by varying the resistance values of resistors 30 and/or by changing the spacing and number of the reed switches 22.

Referring now to FIG. 5, reed switches 22 of arbitrary length may be fit within a compact shaft 14 defined by tubular housing 44 by canting axes 46 of the reed switches 22 with respect to the axis 50 of the shaft 14. This allows overlap of the reed switches 22 in the axial direction without displacing their centers from the axis 50. The reed switches 22 may be positioned and attached to a printed circuit board 42 (typically epoxy fiberglass or other nonmagnetic material) held within the tubular housing 44 according to techniques well known in the art.

It will be understood that other magnetic sensors such as Hall effect devices or magnostrictive devices may be used in lieu of the reed switches 22.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A liquid-level sensor comprising:
a guide that extends along an axis adapted to be positioned in a vertical direction in a liquid holding tank;
a float positioned to move along the guide with changes in liquid height within the tank wherein the float includes at least one magnetic element applying a magnetic field to the guide, the magnetic field moving along the guide with movement of the float;
wherein the guide has a set of axially-spaced magnet sensors switching between an unactivated state and an activated state upon exposure to the magnetic field,
wherein the magnet sensors are positioned along the guide so that movement of the magnetic float activates a new magnet sensor before deactivation of an adjacent previously activated magnet sensor;
further including an electrical circuit communicating with the magnet sensors to provide a signal being a function only of the state of an uppermost activated magnet sensor, the electrical circuit providing resistors connected to the magnet sensors;
whereby the signal is monotonic with movement of the float;
wherein each magnet sensor is a set of multiple magnetic reed switches, each magnetic reed switch having first and second switch terminals electrically connected and disconnected by operation of the reed switch, the reed switches wired in parallel so that all the first terminals of the parallel reed switches within each given sensor are electrically connected directly to each other and all the second terminals of the parallel reed switches within each given sensor are electrically connected directly to each other and wherein the connected first terminals of each sensor are connected to a different node of a network of the resistors;
wherein each reed switch of a sensor is displaced axially from other reed switches of the sensor.

2. The liquid level sensor of claim 1 wherein the sensors are normally open magnetic reed switches.

3. The liquid level sensor of claim 1 wherein an axial spacing of the multiple magnetic reed switches of each sensor is different from the axial spacing of magnetic reed switches between sensors.

4. The liquid level sensor of claim 1 wherein the magnetic element is a pair of axially separated toroidal magnets having axially opposed magnetic fields, the toroidal magnets positioned around the guide and within the float.

5. The liquid level sensor of claim 1 wherein the electrical circuit is a resistor ladder of series-connected resistors defining connection nodes and wherein the sensors connect the nodes to ground when activated and wherein the signal is a voltage at a node.

6. The liquid level sensor of claim 5 wherein the sensors are at least one normally open reed switch connected between a node and ground for multiple nodes.

7. The liquid level sensor of claim 6 wherein each sensor is a set of multiple, normally open magnetic reed switches wired in parallel.

8. The liquid level sensor of claim 7 wherein each reed switch of a sensor is displaced axially from other reed switches of the sensor.

9. The liquid level sensor of claim 8 wherein each reed switch has a principle axis canted with respect to the axis.

10. A method of monitoring a liquid-level comprising the steps of:
(a) positioning a set of sensors along a vertical axis on a guide extending along the vertical axis in a liquid holding tank;
(b) placing a float in the liquid positioned to move along the guide with changes in liquid height within the tank wherein the float includes at least one magnetic element applying a magnetic field to the guide, the magnetic field moving along the guide with movement of the float;
(c) detecting activation of a top most sensor by the magnetic fields to produce a signal;
wherein the sensors are positioned with respect to the magnetic fields so that movement of the magnetic float activates a new sensor before deactivation of an adjacent previously activated sensor;
whereby the signal is monotonic with movement of the float;
wherein each sensor is a set of multiple magnetic reed switches, each magnetic reed switch having first and second switch terminals electrically connected and disconnected by operation of the reed switch the reed switches wired in parallel so that all the first terminals of the parallel reed switches within each given sensor are electrically connected directly to each other and all the second terminals of the parallel reed switches within each given sensor are electrically connected directly to each other and wired in parallel so that all the first terminals of the parallel reed switches within each given sensor are electrically connected directly to each other and all the second terminals of the parallel reed switches within each given sensor are electrically connected directly to each other and so that any one of the magnetic reed switches closing creates an electrical short across the sensor;
wherein the connected first terminals of different sensors are each connected to a different node of a network of resistors; wherein each reed switch of a sensor is displaced axially from other reed switches of the sensor.

* * * * *